United States Patent [19]

Lin

[11] Patent Number: 4,902,411
[45] Date of Patent: Feb. 20, 1990

[54] DRINKING WATER PURIFIER

[76] Inventor: Frank W. G. Lin, No. 1-6 Tyan Sin Tsu, Hsien Hsiao Lih, Tan Shui Town, Taipei Hsien, Taiwan

[21] Appl. No.: 262,434

[22] Filed: Oct. 24, 1988

[51] Int. Cl.⁴ .............................................. B01D 36/00
[52] U.S. Cl. .................... 210/104; 210/138; 210/195.1; 210/196; 210/257.1; 210/259; 210/288; 210/416.3; 250/436; 250/455.1
[58] Field of Search ...................... 210/104, 138, 195.1, 210/196, 257.1, 258, 259, 288, 416.3; 250/436, 455.1, 430, 431; 261/115

[56] References Cited

U.S. PATENT DOCUMENTS

| | | | |
|---|---|---|---|
| 327,269 | 9/1885 | Hegeman | 210/195.1 |
| 377,388 | 2/1888 | Jewell | 210/288 |
| 1,985,435 | 12/1934 | Watson | 210/104 |
| 2,302,240 | 11/1942 | Michaud | 210/288 |
| 2,537,774 | 1/1951 | Machinist | 250/436 |
| 2,587,834 | 3/1952 | Goode | 261/115 |
| 2,591,134 | 4/1952 | Canariis | 267/115 |
| 2,669,661 | 2/1954 | Riddiford et al. | 250/436 |
| 3,935,077 | 1/1976 | Dennison | 202/180 |
| 4,247,369 | 1/1981 | Bean | 202/181 |
| 4,275,020 | 6/1981 | DiGregorio et al. | 261/115 |
| 4,285,813 | 8/1981 | Stewart et al. | 210/416.2 |
| 4,339,307 | 7/1982 | Ellis, Jr. | 202/180 |
| 4,421,643 | 12/1983 | Frederick | 210/138 |
| 4,842,724 | 6/1989 | Bray et al. | 210/104 |

FOREIGN PATENT DOCUMENTS 62-221485  9/1987  Japan .

Primary Examiner—Richard V. Fisher
Assistant Examiner—Christopher Upton

[57] ABSTRACT

A water purifier to purify drinkable water, comprising a packed filter chamber, jet type oxygen dissolution chamber, UV lamp sterilization chamber, water circulation and drainage structure, water supply structure and a control circuit. Such an arrangement removes high polymer hydrocarbon pollutants, low polymer trihalomethane pollutants, and other soluble or insoluble pollutants such as mineral substances, metal salts or other impurities in the water.

8 Claims, 4 Drawing Sheets

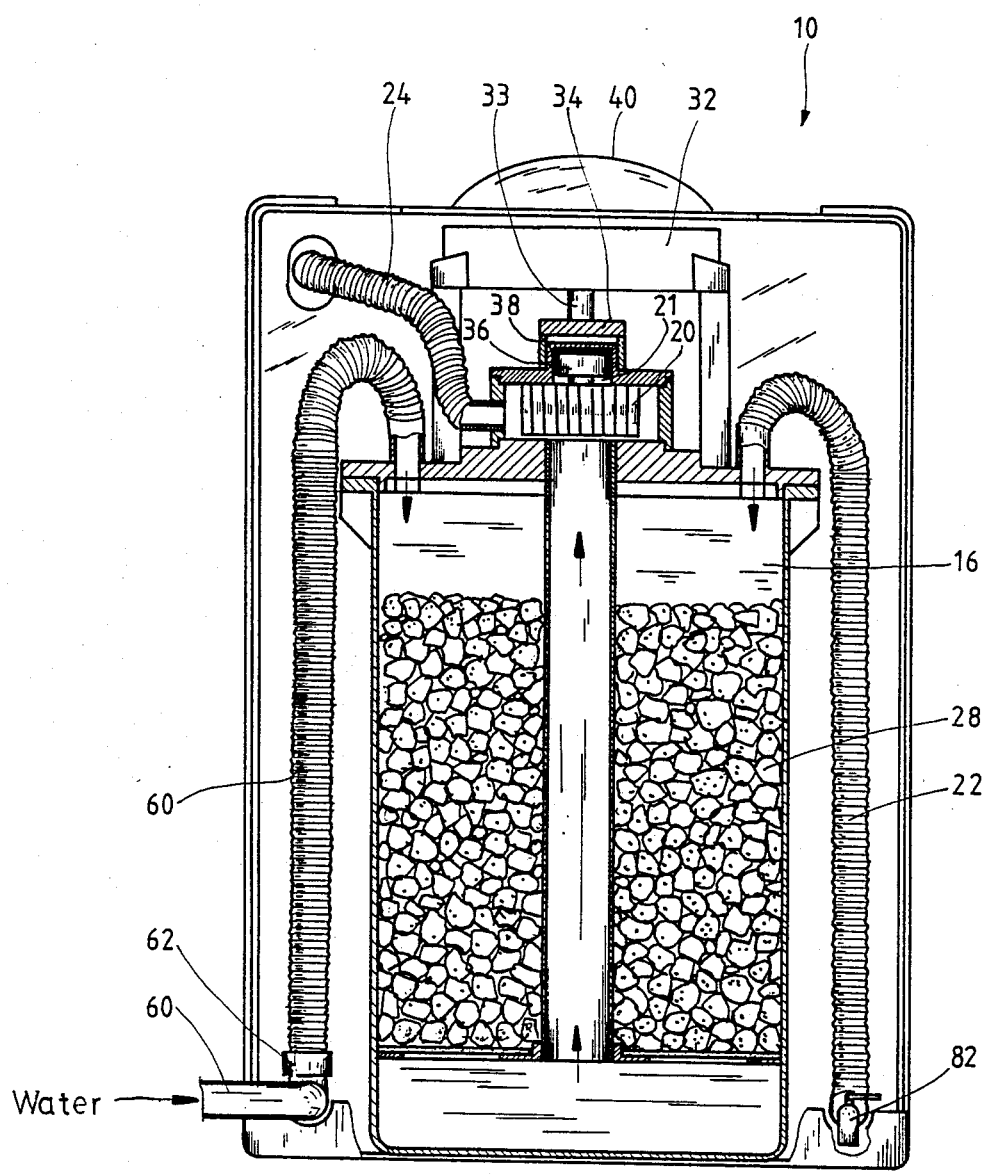
F I G . 2

DRINKING WATER PURIFIER

The present invention relates to a water purifier system, and more particularly to a water purifier system which makes use of filters, ejecting-type oxygen, contact apparatus, and UV sterilization apparatus.

In order to ensure that water is suitable for drinking, the water may be treated to eliminate particulates, dissolved materials and bacteria, and also to separate iron, manganese, and acid radicals from the water.

The drinking water we daily consume may be taken from an urban tap water supply system or from a well. In recent years, due to the construction of factories and houses, and the development of the tourist industry in areas around water sources, the quality of untreated water resulting e.g., in increased microbe pollution and red water problems has been deteriorating, untreated ground water may not be suitable for drinking purposes, due e.g., to high microbe content such as *E. Coli*, shigella, salmonella, etc. exceeding the normal permissible ranges.

The water from waterworks or other public water centers may be sterilized by adding chlorine to reduce microbes content to an acceptable range. Although the comparatively clean water from waterworks may be processed through purifying condensation, chemical treatment and further purifying procedures, many inorganic contaminants such as poisonous heavy metals, aquaregia, and other hydrochloric acids and minerals may still remain in the water. Further, excessive amounts of chlorine and iodine for sterilizing the water may produce malodor or poisonous chemical by-products. Therefore, it is preferable to additionally purify the water from waterworks once again before drinking.

Although a small amount of certain metals is requisite to help metabolism, and not regarded as poisonous, long periods of consumption of certain heavy metals in high concentrations may cause disease. For example, excessive consumption of copper may damage liver function. Also excessive consumption of sodium may cause high blood pressure in the aged. Moreover, an excessive amount of sulfate may produce malodor, cause diarrhea, and result in water stains on water containers. Therefore, it is necessary to further purify regular tap water to eliminate or reduce the content of heavy metals in the water to an acceptable range.

Known methods to separate organic or inorganic matters from water include distillation, carbon absorption, ion exchange, and antipermeation procedures. Purifiers using said methods include U.S. Pat. Nos. 4,339,307, 4,247,369, and 3,935,077.

However, the techniques and devices of the prior art do not efficiently eliminate all pollutants on a consistent bases, more particularly, chloride and sulfate. Further, if ion exchange resins are used for water purification, acid and alkaline substance may be produced for resin regeneration, or certain inorganic salts and dissolved resins may accumulate in the water. If distillation is used, certain metals or alkaline substances may be distilled, or certain salts may be contained in the distilled water due to sudden boiling. In general, contamination may occur during the process to purify the water by means of prior techniques or conventional devices.

SUMMARY OF THE INVENTION

The main object of the present invention is to provide a purifier system which can regularly and efficiently eliminate all pollutants in the drinking water on a consistent basis.

Another object of the present invention is to provide a purifier system which can be constructed for installation either at home, or office, or other work places.

In general, a water purifier system of the present invention may comprise a packed filter chamber, jet-type oxygen contact chamber, UV lamp sterilization chamber, water feeding and drainage structure, water supply structure, internal circular piping system, and a control circuit. the purifier system can remove high polymer hydrocarbon pollutants, low polymer trihalomethane pollutants, and other soluble or insoluble pollutants such as mineral substances, metal salts or other impurities in the water.

BRIEF DESCRIPTION OF THE DRAWINGS

The drawings disclose an illustrative embodiment of the present invention, wherein:

FIG. 2 is a back-side and partially sectional view of the embodiment shown in FIG. 1;

DETAILED DESCRIPTION OF THE PREFERRED EMBODIMENT

Referring to the preferred embodiment as shown in the accompanying drawings, a purifier 10, according to the present invention, comprises oxygen dissolution (or air-water contact) chamber 12, UV sterilization 14, filter chamber 16, and a piping system and control circuit. The said piping system includes water feed, water drainage, and internal circulation systems.

Figure 1:
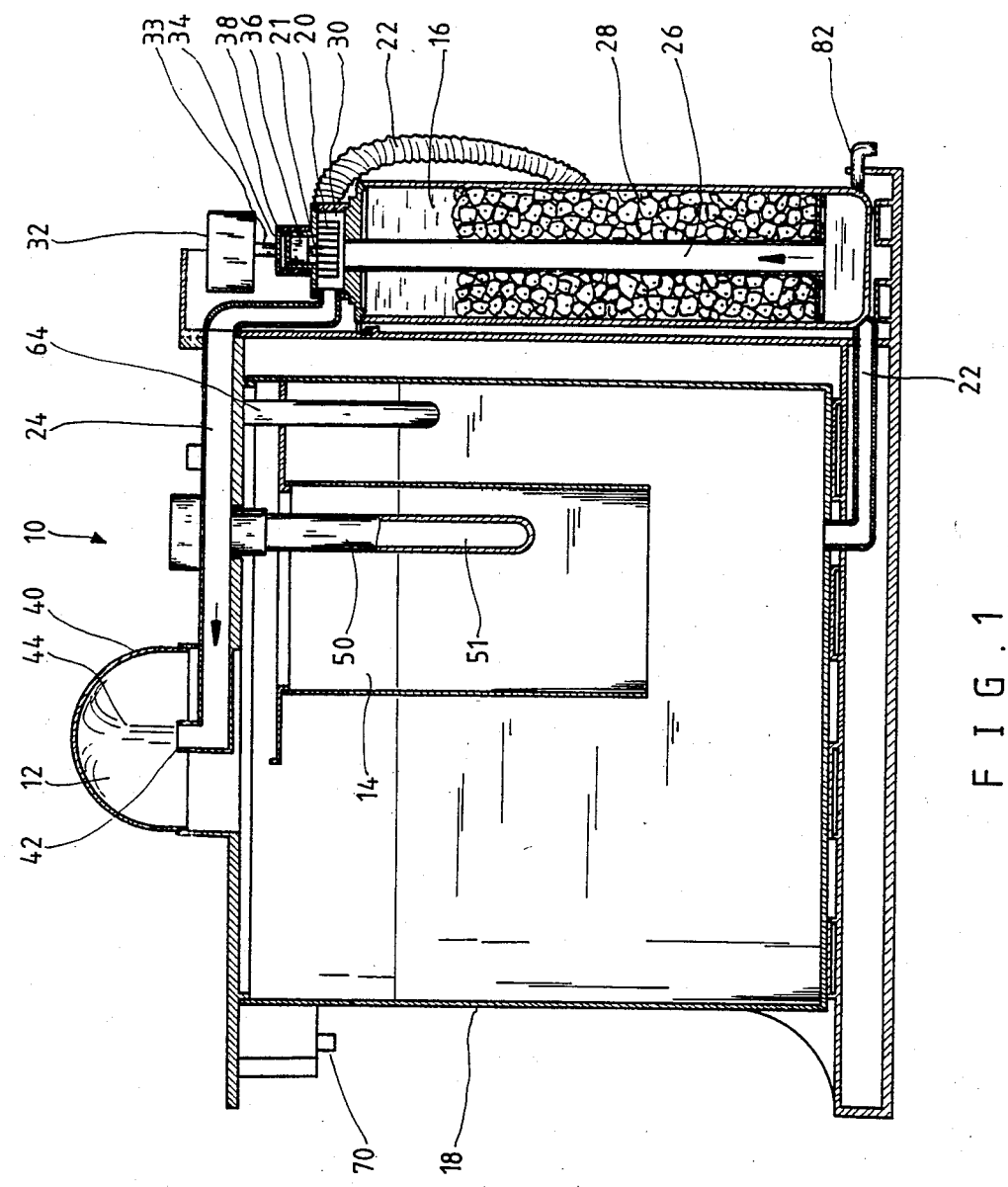
FIG. 1 is a longitudinal sectional view of a purifier according to the present invention, illustrating the various compartments of this preferred embodiment.

Referring to FIG. 1, there is shown an internal circulation system that comprises circulation pipes 22 and 24 extending between dissolution chamber 12, UV sterilization chamber 14, filter chamber 16, and water tank 18 of the purifier system 10. Untreated water from an urban water supply system or other public water supply center is introduced to the purifier system through water feed line 60. A motor-operated pump 20 is included in the internal piping system to continuously pump water from water tank 18 into the other elements 16, 12 and 14 for filtration, oxygen dissolution, and sterilization treatment. The sterilized water is circulated back to the water tank 18. The said internal circulation piping includes: a circulating pump 20, first water distribution pipe 22 from water tank 18 to filter chamber 16, and second water distribution pipe 24 from filter chamber 16 to oxygen dissolution chamber 12. The said oxygen dissolution chamber 12 is arranged to communicate with said water tank 18 via a drainage path through the tank roof.

The filter chamber (column) 16 is arranged at the back of water tank 18 to receive water from the first water distribution pipe 22 and/or from water feed piping 60. As shown in FIG. 2, water flows downwardly through filter material 28 to an outlet chamber at the lower end of the column, and then upwardly through a discharge pipe 26. The filter material 28 may be selected from natural filter substances, active carbon, polypropylene, acetate fiber, polyester non-woven cloth, or asbestos, or the combination of said materials. The said filter material 28 has the ability to remove hydrocarbon pollutants or other high polymer substances from the water. These hydrocarbon and high polymer pollutants are inevitably contained in the water source due to abuse of insecticides, herbicides, and other industrial waste materials.

The circulating pump element 20 (FIG. 1) is arranged in a pump chamber 30 located atop filter chamber 16 in fluid communication with the central outlet pipe 26. Pump element 20 is directly driven by a motor 32 to draw water from the water tank 18 into the filter chamber 16 via the first water distribution pipe 22. The water from filter chamber 16 is further circulated through second water distribution pipe 24 and oxygen dissolution chamber 12 back to the original water tank 18. Because of the water pressure from the water supply system and the force from circulating pump 20, the filter chamber 16 and the pump chamber 30 are always fully filled with water. The shaft 21 of the pump 20 and the shaft 33 of the motor 30 are indirectly connected with each other by means of permanent magnets 34 and 36, and an intervening plastic wall 38. Wall 38 acts as an isolator to prevent impurities from passing through the pump chamber 30 into the drinking water such impurities can include carbon molecules, metal powder and lubricant that can come off motor 32 and motor shaft 33.

The oxygen dissolution (air-water contact) chamber 12 is comprised of a transparent and semi-circular housing 40 arranged at the top of the water tank 18, with a drain opening at the bottom to communicate with the water tank 18. The second water distribution pipe 24 comprises an upwardly directed nozzle jet 42 at its downstream end to penetrate into the oxygen dissolution chamber 12. Therefore, the water pumped by the circulating pump 20 is ejected upwardly through the nozzle jet 42 to provide a fountain-like flow 44 to increase the water contact surface and the contact time with the air. The heavy metals that are dissolved in the water and not removed by the filter material 28 (such as iron, manganese, copper, and sulfate) are fully oxidized in the oxygen dissolution chamber 12 to form into insoluble compounds. These insoluble compounds will later be filtered by the filter material 28 while passing through the filter chamber 16.

The UV sterilization chamber 14 is defined by a hollow cylindrical housing arranged inside the water tank 18. Centrally arranged within chamber 14 is a UV lamp 50. The inner wall of sterilization chamber 14 is smooth to reflect light and thus reinforce the sterlization strength of the UV lamp 50; the reflective wall 14 also helps to radiate ultraviolet rays onto the bottom of the water tank 18. The sterlization chamber 14 has a baffle at its upper end, such that all water or the majority of the water dropping from the upper oxygen dissolution chamber 12 is directed into chamber 14. The *E. Coli, Bacillus Subtillis,* Chlorobacterium contained in the water are grossly killed by the UV radiation.

UV sterilization is an economical method that is easy to carryout without polluting or otherwise affecting water properties. It is effective on most bacteria and applicable for long term sterlization to kill or prohibit the generation of bacteria in the water within water tank 18.

According to photo-biology, the UV rays within 180-280 nm is classified UV-C, of which the wave length is shorter than UV-A (320-400 nm) or UV-B (280-320 nm) which are contained in regular or severe sunlight. UV-C is harmful to creatures, may cause microbes to mutate or may kill the microbes. It has also been revealed that specificity is discovered when 260 nm UV sterilization is performed. It is reported that UV sterilization produces pyrimidine dimer which kills the bacteria. Further, UV rays may cause the nucleic acid of microbes to produce photosynthetic reaction, and photobridging reaction while nucleic acid and protein are reacted with each other. These reactions are also harmful to the microbes.

The said UV lamp 50 uses low pressure mercury to produce artificial UV rays of 253.7 nm to efficiently kill microbes. The functional design of the said UV lamp 50 is similar to regular fluorescent lamps. However, the tube 51 of the said UV lamp 50 is not coated with fluorescent material; instead it is made of quartz glass to provide high penetrability for UV rays. The output of the UV rays from the UV lamp rays. The output of the UV rays rom the UV lamps 50 varies with the mercury vapor pressure in the tube 51; the mercury vapor pressure is affected by the tube wall temperature. Therefore, maximum output of UV rays is achieved if the tube wall temperature is maintained at 40°-50° C.

The water in the water tank 18 is continuously pumped out by the circulating pump 20 to further circulate among the filter chamber 16, the oxygen dissolution chamber 12, the sterilization chamber 4 and the water tank 18. During circulation, the water is continuously subjected to filtration, oxidization, and sterlization treatments. All possible hydrocarbon high polymer, metallic salts, mineral substances and soluble or insoluble pollutants, and bacteria and microbes are removed or killed within 10 minutes. Therefore, after a short period of circulation, the water in the water tank 18 is suitable for use as drinking water.

Figure 3:
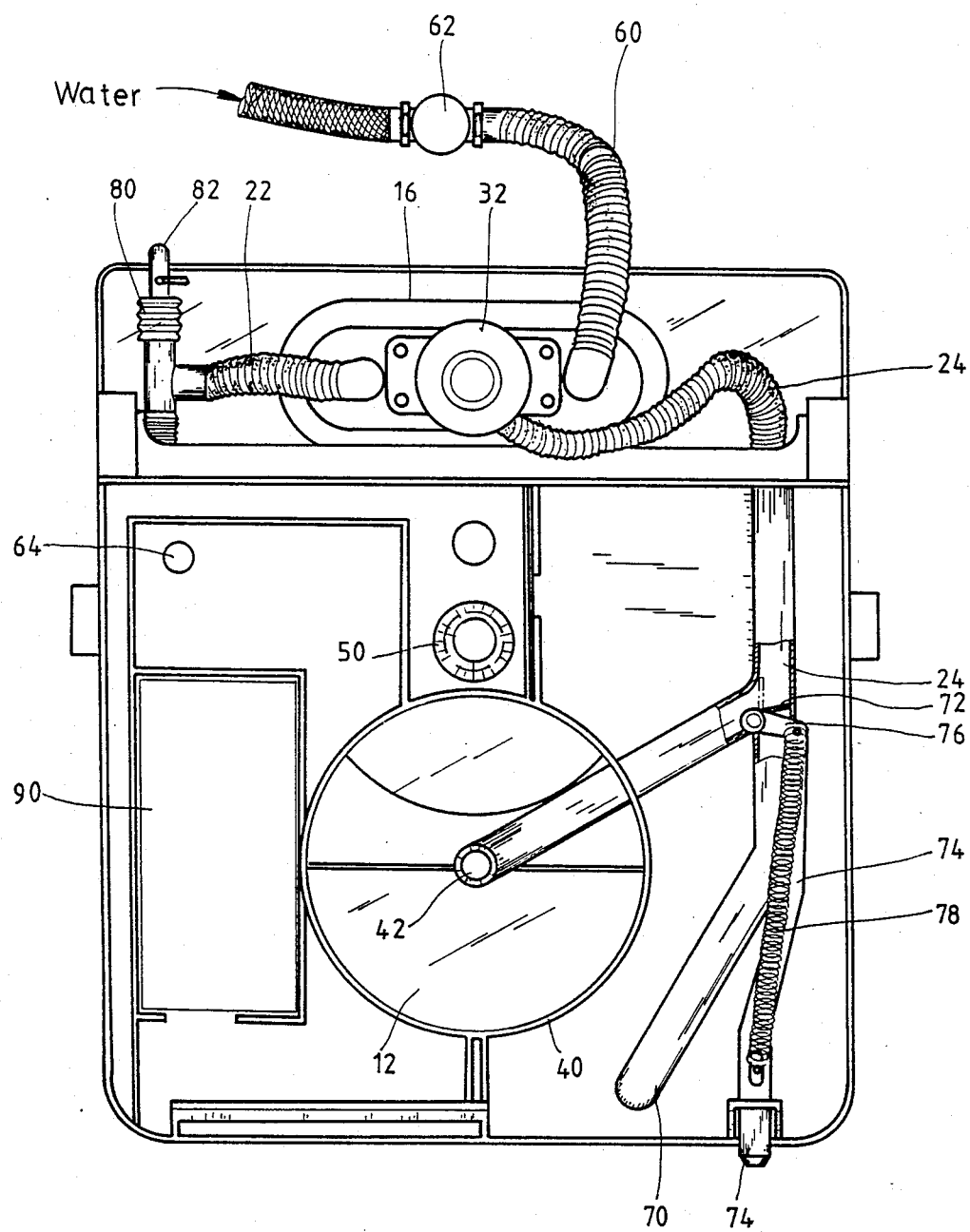
FIG. 3 is a top plan and partially sectional view of the embodiment shown in FIG. 1.

Please refer to FIGS. 2 and 3 regarding water feeding, water supply, and water drainage systems.

The water feeding system includes a water inlet pipe 60 to connect with an outside tap water or other public water supply; the system includes a solenoid valve 62 and a water level detector 64. When the water level detector 64 senses that the water in the water tank 18 is below a certain level, the electronic control circuit illustrated in FIG. 4, will immediately drive the solenoid valve 62 to open, so as to let outside water pass through water inlet pipe 60 and filter chamber 16 (by means of its water supply pressure). After initial filtration the water is circulated through the second water distribution pipe 24 to finally return to the water tank 18. When the water level detector 64 detects that the water in the water tank 18 has raised over a fixed high level, it will immediately provide the control circuit with a signal to turn off the solenoid valve 62, so as to stop water feeding. At the same time, the circulating pump 20 will be simultaneously driven to pump the water for recirculation.

The water supply system includes a water outlet pipe 70 (FIG. 3) that communicates with the second water distribution pipe 24. A diverter valve 72 controls water flow through outlet pipe 70; a manual push rod 74 and link 76 are connected to valve 72 for operating the valve. A spring 78 normally keeps valve 72 in a shut-off position wherein water flows through distribution pipe 24 to water jet 42. To take water for drinking, the user needs only to push rod 74, to thereby shift the valve to its ON position (as illustrated in dotted lines in FIG. 3). Water is pumped by circulating pump 20 through the water distribution pipe 24 into the water outlet pipe 70 for ready use. As soon as the push force is released from push rod 74, the drag spring 78 will immediately drive the push rod, the link lever and the valve return to original position, to shut off the flow of water through outlet pipe 70. While taking the water from the water purifier, the user must wait until the water in the water tank 18 is processed. For better identification, the control circuit is provided with an indicator lamp to indicate that the water in the water tank 18 is being processed or purified.

A drain pipe 80 (FIG. 3) is connected to the first water circulation pipe 22 at its lower end for draining off water when it is necessary to clean the water tank or the filter, or if the water from the water feeding system is excessively turbid. A valve 82 in pipe 80 can be opened by manual operation to let the water in water tank 18 drain away through the water drain pipe 80. During the draining process, the power switch of the purifier system 10 must be turned off to stop water feeding.

Figure 4:
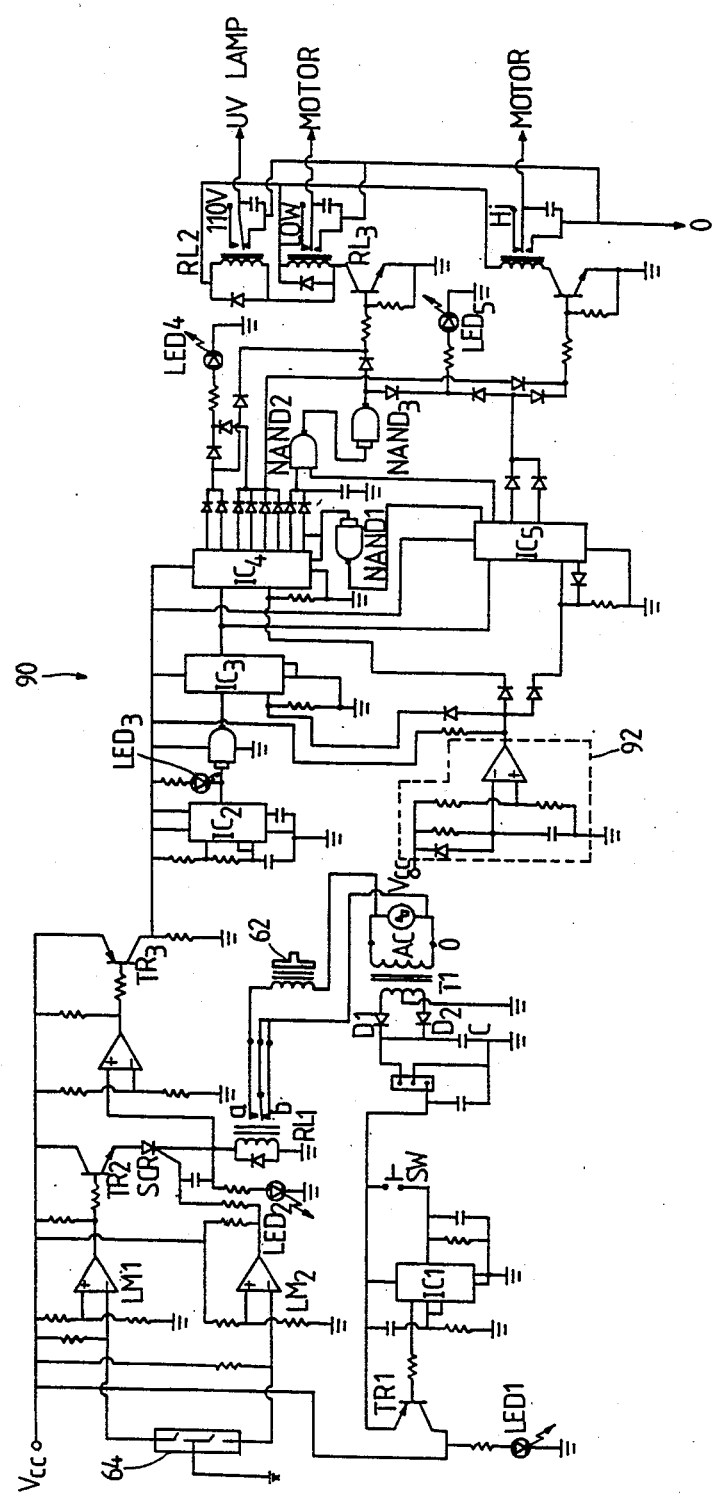
FIG. 4 is a control circuit diagram that may be used in FIG. 1 embodiment.

Please refer to the control circuit diagram 90 of the present purifier 10 as illustrated in FIG. 4. The purifier system 10 is connected to a regular AC power supply. The AC power is transformed into a low potential AC by a transformer T1. The lower potential AC thus obtained is further rectified through diodes D1 and D2 and filtrated through condenser C to produce a DC voltage. The said DC voltage thus obtained is stabilized through a stabilizing circuit 1C1 to further provide a stable 12V DC power. The power switch SW is to control power supply. When the power switch SW is switched ON, TR1 is drive ON, and power indicator lamp LED1 is lit to indicate that the power is ON. Since the water level detector 64 is comprised of a reed switch and a magnetic foam, and the gravity of the magnetic foam is less than 1 (is lighter than water), when the power is connected to Vcc, the magnetic foam is floating in the water to rise and fall in accordance with the water level. If the water reaches the pre-fixed low level, the water level detector will immediately provide the comparator LM2 with a ground signal at the input terminal, to let the comparator LM2 give a trigger signal to the grid of the silicone control rectifier SCR. The silicone control rectifier SCR further turns on the coil of the relay RL1. Therefore, the contact point is jumped from N.C. (b point) to N.O. (a point) to let the electric current be connected to solenoid 62 to turn it on, so as to let outside water be fed into the water tank 18 through the water feeding system. At the same time, the water inlet indicator lamp LED2 (red lamp) is lit and the motor and the UV lamp are shut off. When the magnetic foam of the water level detector follows the water level to rise to the pre-fixed high level, the detector will immediately provide the comparator LM1 with a high potential voltage (about 12V) at the input terminal to change the output terminal of the comparator LM1 from positive potential into "low" potential, so as to short-cut the silicone control rectifier SCR. The relay RL1 is therefore, turned off, to let the contact point be jumped from N.O. (a contact point) to original N.C. (b contact point). The solenoid 82 is thus shut off to stop water feeding, and the water inlet indicator lamp LED2 is turned off. At the same time, another transistor TR3 is turned on to start internal circulation of water treating process. At first, an oscillator IC2 is driven to produce a series of pulse oscillation signals for a cycle of 1 minute. And at the same time, the high level or stop feeding indicator lamp LED3 is energized. The said oscillation signals are sent to a first counter IC3. The said first counter IC3 is a frequency discriminate circuit, which extends the cycle of the original oscillation signals by ten times, and add the signals to a second counter IC4 for further counting. When the first 1-2 clock signals are sent to the second counter IC4, the indicator lamp LED4 is lit to indicate the initiation of water purification, and water feeding must be stopped. At the same time, the said two relays RL2 and RL3 are driven to trip, the circulating pump is driven to operate at low speed to further pump the water, and the UV lamp is lit to start sterilization process. When the first 3-6 clock signals are provided, the motor is driven to operate at high speed, and the UV lamp is turned off, while the indicator lamp LED4 keeps illuminating. When the 7th clock signal is provided, a water supply indicator lamp LED5 is turned on to indicate that the water in the water tank is fully purified to a safety standard, ready for use. When the 8th clock signal is started, a first NOT AND gate NAND1 is produced to provide the third counter IC5 with a low potential, so as to let the third counter IC5 start counting. When this clock signal is sent to the third counter IC5, a second NOT AND gate NAND3 gives an output of high potential, to drive the motor turn to low speed operation, the UV lamp is energized again to provide UV rays, and the water supply indicator lamp LED5 keeps illuminating. When the 9-10th clock signals are sent to the said third counter IC5, the motor turns to high speed operation again, and the UV lamp is turned off, while the indicator lamp LED5 remains illuminating. Until the next clock signal is provided, the third counter IC5 is cleared to stop counting, and the second counter IC4 starts to count. By means of said circulation, the quality of the water in the water tank is constantly maintained within normal range for safety drinking service. The above-said internal circulation will be stopped when the power switch SW is switched off, or when the solenoid 62 is reset to start. The present invention also comprises a clear circuit 92 to clear all the counters IC3, IC4, and IC5 when these counters are driven to resume counting.

The said control circuit 90 controls the purifier 10 to automatically start the water feeding and purification process. While outside water is filling water tank 18 the water flows slowly through filter chamber 16, oxygen dissolution chamber 12 and UV lamp sterlization chamber 14. Thereafter the water flows at high speed through the filter chamber, oxygen dissolution chamber and UV lamp extinguished sterilization chamber. By means of this arrangement, and after a short period of time, the water in the water tank will be purified to a clean water state.

As indicated, the structure herein may be varied as to structural detail; Various modifications will be apparent.

What is claims is:
1. A water purifier system comprising:
an upstanding water tank;
a water filtration unit located alongside said water tank;
an air-water contact means located directly above said water tank;
an ultraviolet lamp means located within said tank;
means for circulating water from the tank through the filtration unit, air-water contact means, and back into the tank; said circulating means comprising a motor-operated pump, and a conduit extend- ing from the filtration unit to the air-water contact means;

means for introducing make-up water to the purifier system, comprising a solenoid valve;

means for withdrawing purified water from the system comprising a diverter valve located in said conduit; and control means for continuously operating the motor-operated pump except when the solenoid valve is opened to introduce make-up water into the system.

2. The water purifier system of claim 1 wherein said air-water contact means comprises a semi-spherical dome extending upwardly from said tank, and an upwardly-directed water jet means located centrally below the dome interior surface.

3. The water purifier system of claim 2 wherein said ultraviolet lamp means comprises a lamp extending vertically downwardly into the tank at a point slightly offset from said dome, and baffle means located below the dome to direct aerated water into proximity to the ultraviolet lamp.

4. The water purifier system of claim 1 wherein said water filtration unit comprises a vertical column having an upper inlet chamber, a lower outlet chamber, packing between the two chambers, and a discharge pipe extending upwardly from the outlet chamber through the packing and inlet chamber.

5. The water purifier system of claim 4 wherein said motor-operated pump is located above the filtration unit in fluid communication with said discharge pipe.

6. The water purifier system of claim 1 wherein said means for introducing make-up water is connected to a point in the system immediately upstream from the filtration unit, so that make-up water is filtered without being diluted by water already in the system.

7. The water purifier system of claim 1 wherein said control means comprises a liquid level sensor responsive to liquid levels in said tank, and an electronic control circuit interconnecting said sensor, motor-operated pump and solenoid valve.

8. The water purifier system of claim 7, wherein said motor-operated pump includes a motor having a high speed mode and a low speed mode; said control means including means interconnecting the motor and ultraviolet lamp means so that the ultraviolet lamp means is energized only when the motor is in its low speed mode.

* * * * *